(12) United States Patent
Simmons et al.

(10) Patent No.: US 8,641,055 B2
(45) Date of Patent: Feb. 4, 2014

(54) SNOW MACHINE SKI

(76) Inventors: Verlin M. Simmons, Providence, UT (US); Val J. Simmons, Providence, UT (US)

( * ) Notice: Subject to any disclaimer, the term of this patent is extended or adjusted under 35 U.S.C. 154(b) by 15 days.

(21) Appl. No.: 13/412,526

(22) Filed: Mar. 5, 2012

(65) Prior Publication Data

US 2012/0256382 A1 Oct. 11, 2012

Related U.S. Application Data

(63) Continuation-in-part of application No. 12/727,204, filed on Mar. 18, 2010, now abandoned, which is a continuation of application No. 11/687,416, filed on Mar. 16, 2007, now abandoned.

(60) Provisional application No. 60/783,458, filed on Mar. 17, 2006, provisional application No. 60/846,983, filed on Sep. 25, 2006.

(51) Int. Cl.
*B62B 9/04* (2006.01)

(52) U.S. Cl.
USPC ............................................. 280/28; 280/22

(58) Field of Classification Search
USPC ........ 280/28, 609, 21.1, 22.1, 14.2, 608, 606, 280/602, 22; 180/182, 190
See application file for complete search history.

(56) References Cited

U.S. PATENT DOCUMENTS

| | | |
|---|---|---|
| 514,469 A | 2/1894 | Hurtubise |
| 780,149 A | 1/1905 | Anderson |
| 996,251 A | 6/1911 | Jennings |
| 2,038,077 A | 4/1936 | Haglund |
| 3,301,569 A | 1/1967 | Broschart |
| 3,643,979 A | 2/1972 | Richards |
| 3,675,939 A | 7/1972 | Vik |
| 3,711,109 A | 1/1973 | Hofbauer |
| 3,738,676 A | 6/1973 | Hand |
| 3,785,448 A | 1/1974 | Merenheimo et al. |
| 3,817,544 A | 6/1974 | Labelle |
| 3,844,367 A | 10/1974 | Flohr |
| 3,870,331 A | 3/1975 | Cryderman |
| 3,901,525 A | 8/1975 | O'Brien et al. |
| 4,116,455 A | 9/1978 | Dotson et al. |
| D256,224 S | 8/1980 | Fritz |
| 4,491,333 A | 1/1985 | Warnke |
| 4,869,336 A | 9/1989 | Nakasaki et al. |
| 4,896,895 A | 1/1990 | Bettosini |
| 5,083,809 A | 1/1992 | Stampacchia et al. |
| 5,145,195 A | 9/1992 | Campbell et al. |
| 5,145,201 A | 9/1992 | Metheny |
| 5,165,709 A | 11/1992 | Jacques |

(Continued)

FOREIGN PATENT DOCUMENTS

| | | |
|---|---|---|
| FR | 396225 | 4/1909 |
| FR | 2662610 | 12/1991 |

*Primary Examiner* — Hau Phan
(74) *Attorney, Agent, or Firm* — Briggs and Morgan, P.A.

(57) ABSTRACT

A ski for a snowmobile is provided with a pair of lateral wings and a central channel for increasing the flow of snow under a gliding surface at the bottom of the ski. The increased flow of snow enhances flotation of the ski. The channel may be formed by two downwardly extending keels. The wings are defined between the keels and outer edges of the ski. The keels may be asymmetric with a shorter keel being positioned toward an outer edge of the snowmobile to improve handling characteristics of a snowmobile.

19 Claims, 22 Drawing Sheets

(56) References Cited

U.S. PATENT DOCUMENTS

| | | |
|---|---|---|
| 5,344,168 A | 9/1994 | Olson et al. |
| 5,360,220 A | 11/1994 | Simmons |
| D366,014 S | 1/1996 | Lindquist et al. |
| 5,700,020 A | 12/1997 | Noble |
| 5,836,594 A | 11/1998 | Simmons |
| 5,868,405 A | 2/1999 | Lavecchia et al. |
| 6,012,728 A | 1/2000 | Noble |
| 6,267,392 B1 | 7/2001 | Noble |
| 6,276,699 B1 | 8/2001 | Simmons et al. |
| 6,431,561 B1 | 8/2002 | Hedlund |
| 6,520,512 B1 | 2/2003 | Lachance |
| 6,626,444 B2 | 9/2003 | Noble |
| 6,692,009 B2 | 2/2004 | Lemieux |
| 6,955,236 B2 | 10/2005 | Roberts et al. |
| 6,991,056 B2 * | 1/2006 | Roberts et al. ............ 280/609 |
| 7,090,229 B2 | 8/2006 | Monsrud et al. |
| 7,232,134 B2 | 6/2007 | Ruzewski et al. |
| 7,264,250 B2 | 9/2007 | Lachance |
| 2006/0061051 A1 | 3/2006 | Lemieux |
| 2006/0061052 A1 | 3/2006 | Lemieux |

* cited by examiner

SNOW MACHINE SKI

RELATED APPLICATIONS

This application is continuation in part of U.S. Ser. No. 12/727,204, which was a continuation of U.S. Ser. No. 11/687,416, filed Mar. 16, 2007, which claims priority from U.S. Provisional Application Nos. 60/783,458 filed on Mar. 17, 2006, and 60/846,983 filed on Sep. 25, 2006, each application being hereby incorporated by reference in its entirety.

FIELD OF THE INVENTION

The present invention relates to snow skis. More particularly, the invention relates to snowmobile skis providing for increased deep powder flotation and enhanced steering response and machine maneuverability.

BACKGROUND OF THE INVENTION

As snowmobiles have improved, it is recognized that the ability of the skis to provide flotation, properly control the snowmobile, and maintain an intended direction of travel have lagged behind. Conventional skis also exhibit shortcomings in the area of flotation in deep powder snow. Typically, in such snow conditions, a high rate of speed can keep the snowmobile ski planing upon the surface. However, on steep slopes or particularly deep snow the ability of the ski to continue planing can be limited Thus, as technological barriers are being overcome, certain limitations of current snow machines have come glaringly to light. To fully utilize current technological benefits, snowmobiles must be provided with increased flotation ability, steering ability, and tracking capability. Until these needs are met, much terrain will remain impassible or at least dangerous to the operators of snow machines.

BRIEF SUMMARY OF THE INVENTION

The present invention is directed to a snow ski capable of providing enhanced machine operation across a variety of snow surfaces. In one example, a snowmobile ski embodies aspects of the present invention and is provided with a pair of lateral wings and a central channel for increasing the flow of snow under the ski during operation. The increased flow of snow enhances flotation of the ski, particularly in deep powder conditions. The channel may be formed between two keels, one disposed to either side of a gliding surface of the ski. The pair of lateral wings may be combined as an integrated ski or be separable, replaceable components which may be selectively attached to an existing ski. These wings significantly improve the handling characteristics and capability of the snow machine, particularly in deep snow. Ski embodiments having asymmetric keels can also provide improve performance characteristics of the snowmobile. In one embodiment, keels have substantially different lengths, with a shorter keel being positioned at an outer edge of the snowmobile.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The present invention may be embodied as a snowmobile ski to improve the ski's ability to float on top of deep powder snow, track straight across a variety of terrain, maneuver effectively on steep hills, and turn sharply in different snow conditions, particularly light and deep snow. Other aspects of a snow machine ski are disclosed in Applicant's U.S. Pat. Nos. 5,360,220, 5,836,954 and 6,276,699, each of which are hereby incorporated by reference into this document.

Figure 1:
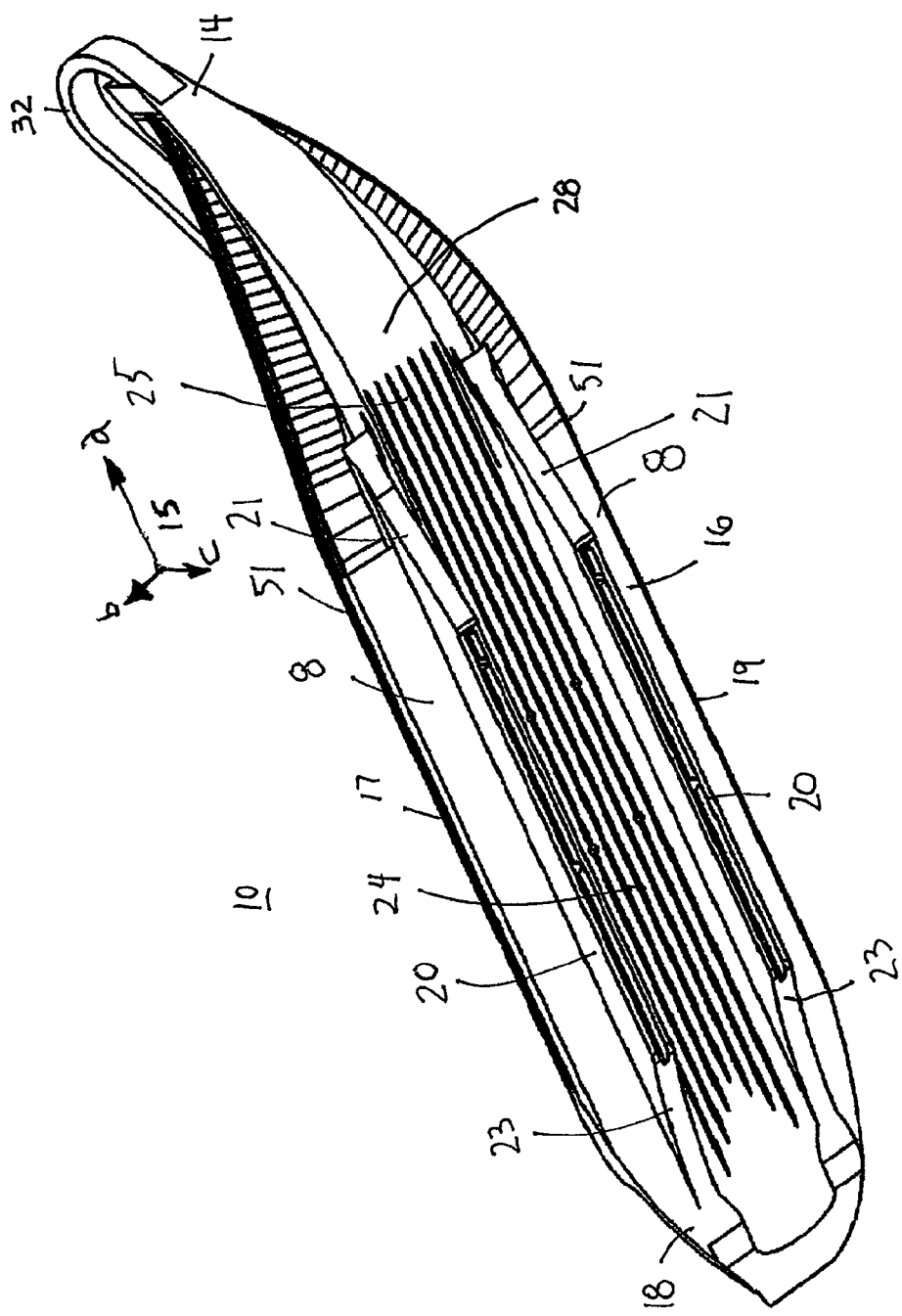
FIGS. 1-4 are perspective views illustrating an embodiment of the present invention in which a ski is provided with a contoured gliding surface including a channel and a pair of longitudinal powder wings.
Figure 2:
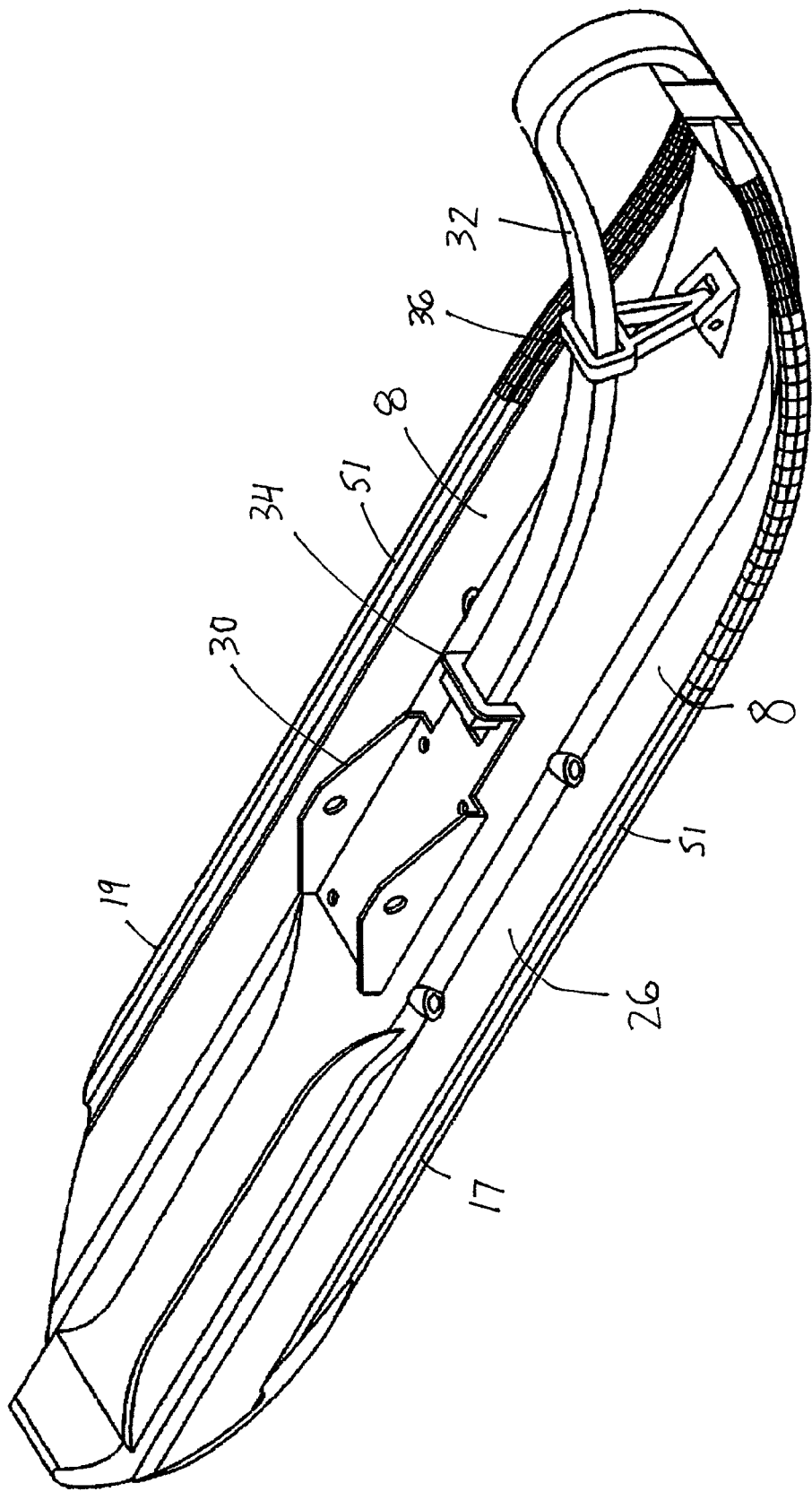
Figure 3:
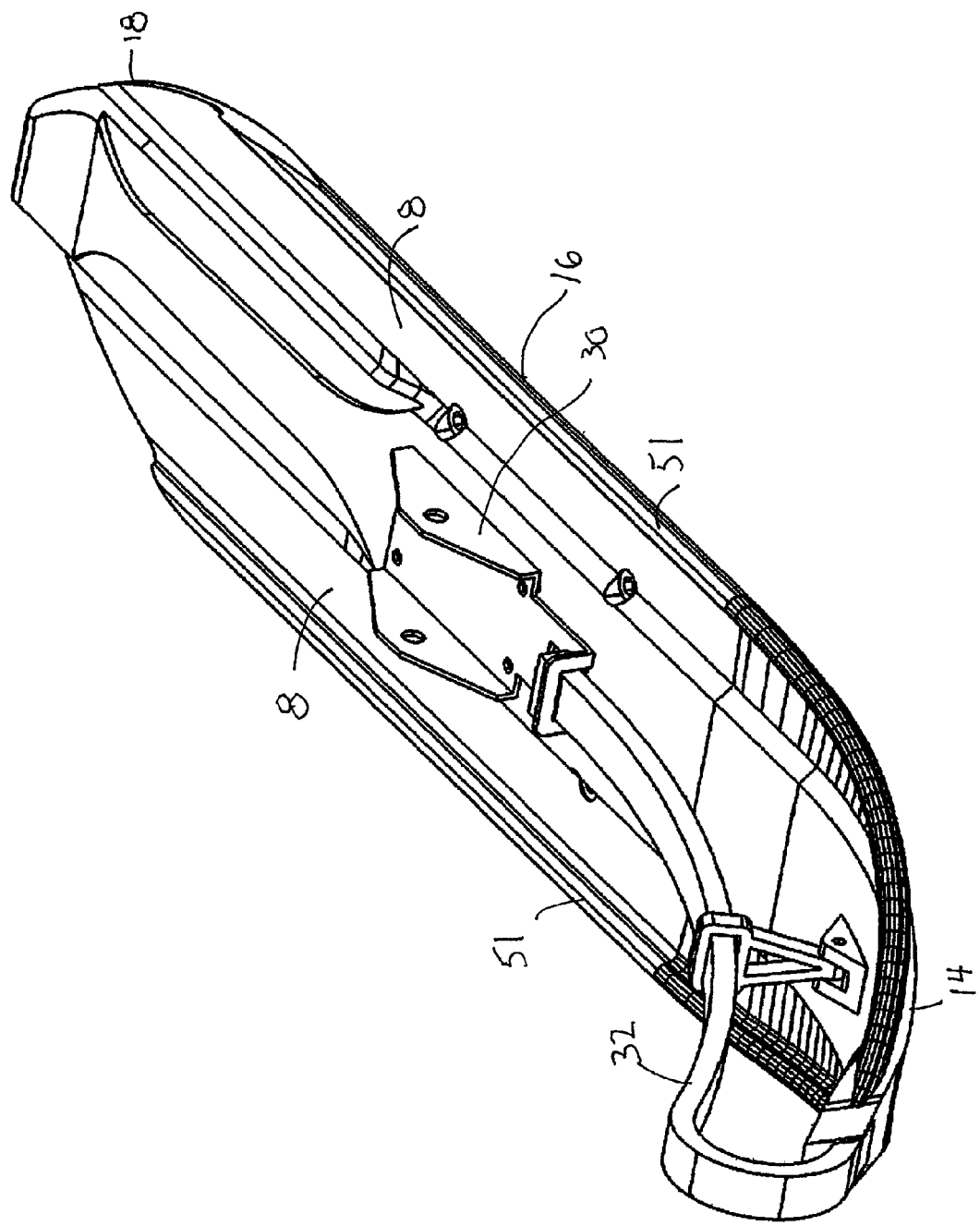
Figure 4:
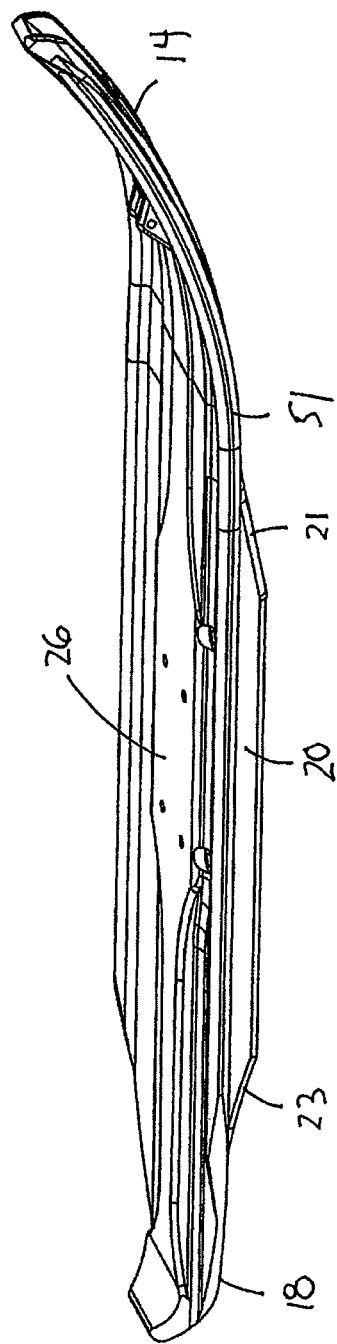
Figure 5:
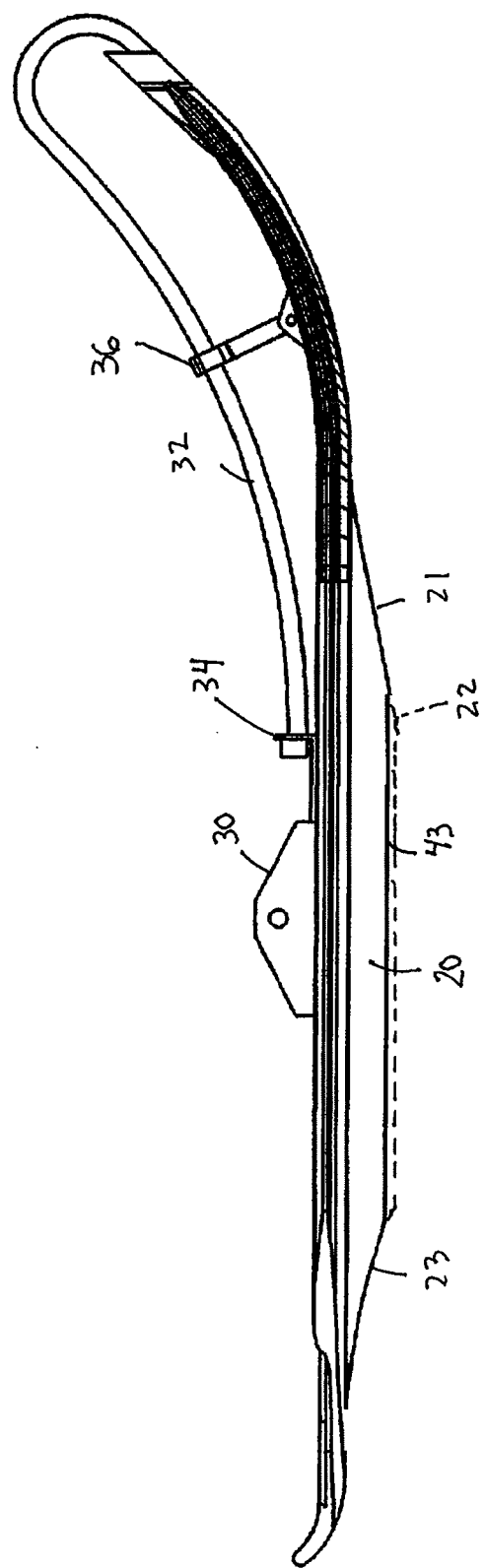
FIGS. 5-6 are side elevation views of the ski of FIG. 1.
Figure 6:
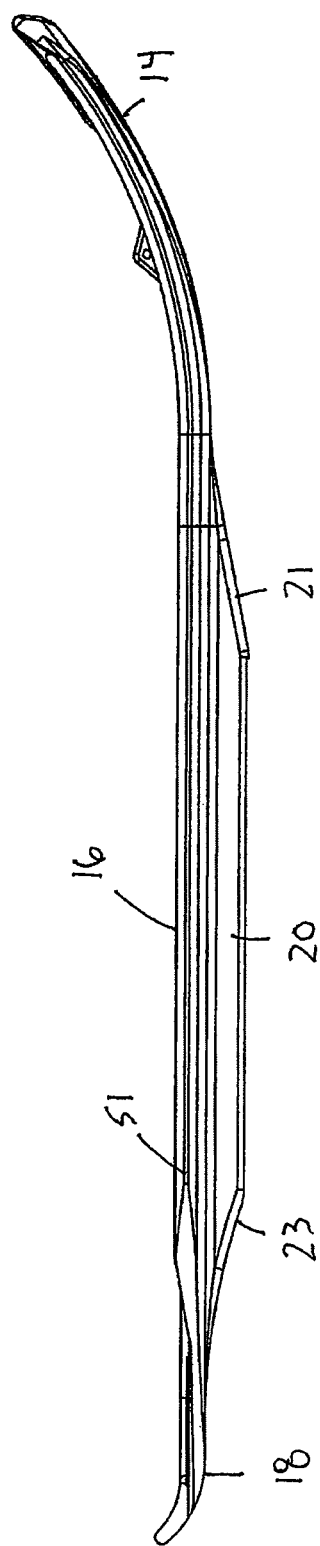
Figure 7:
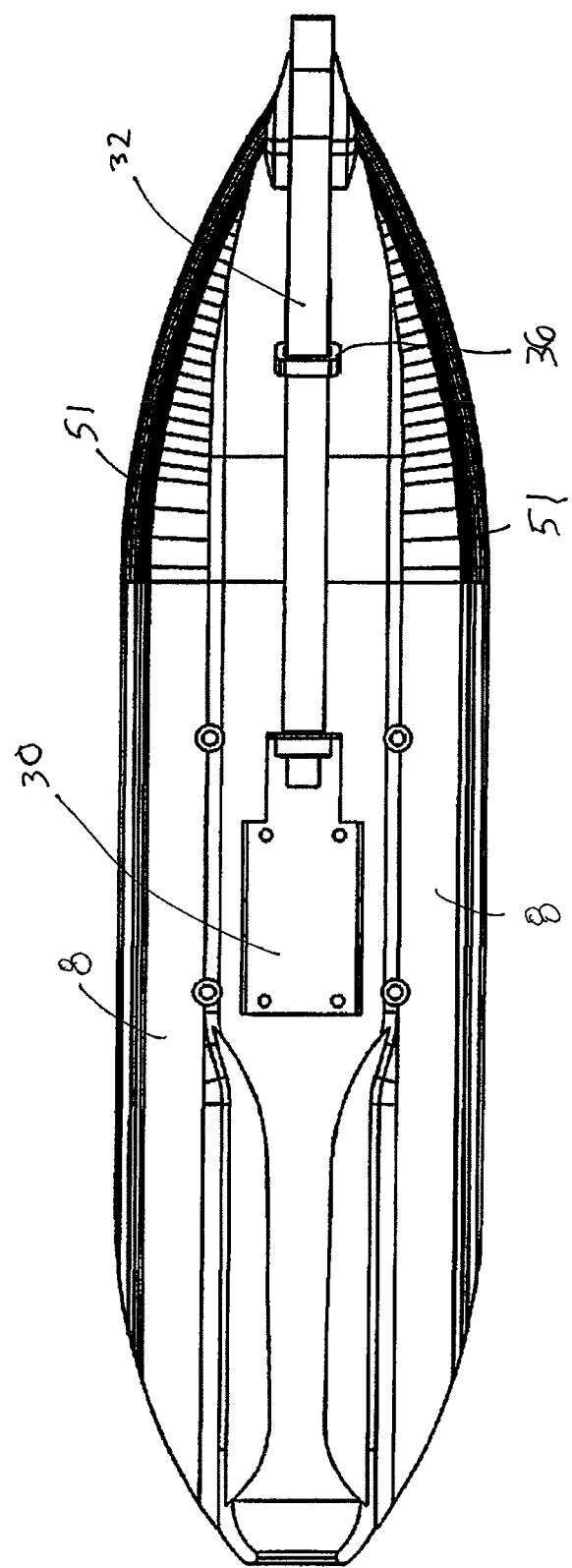
FIGS. 7-8 are top plan views of the ski of FIG. 1.
Figure 8:
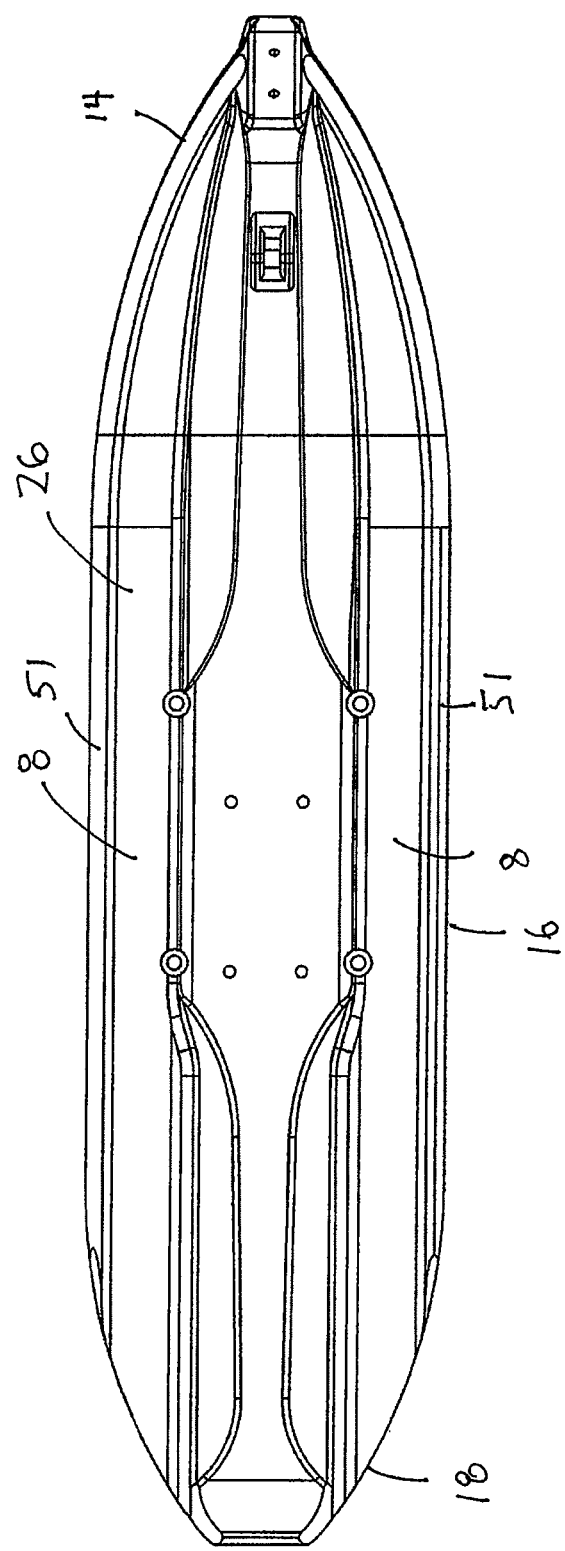
Figure 9:
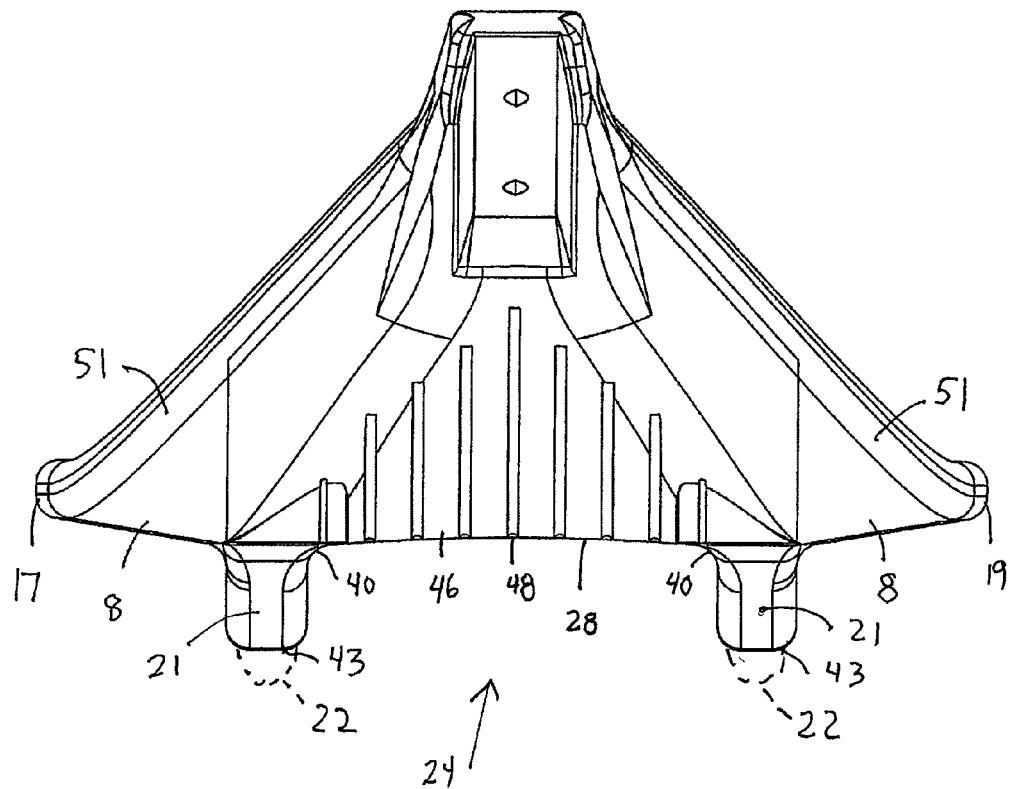
FIG. 9 is a front elevation view of the SKI of FIG. 1.
Figure 10:
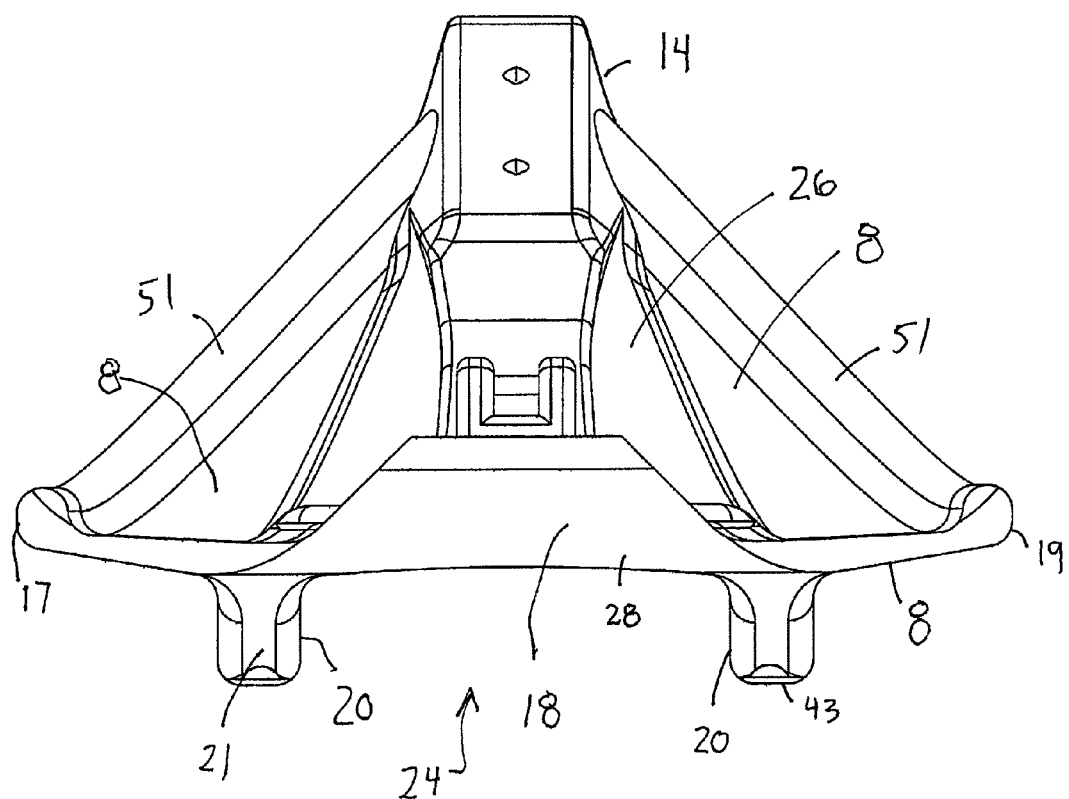
FIG. 10 is a back elevation view of the SKI of FIG. 1.
Figure 11:
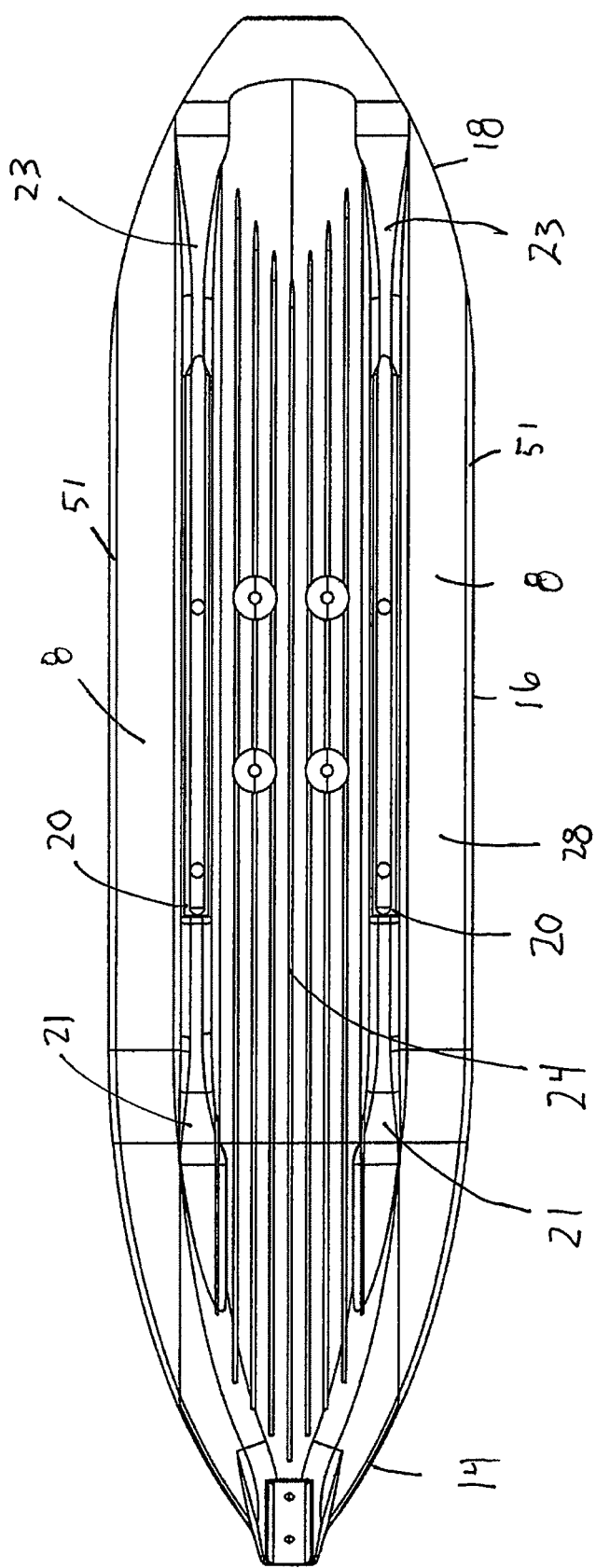
FIG. 11 is a bottom plan view of the SKI of FIG. 1.
Figure 12:
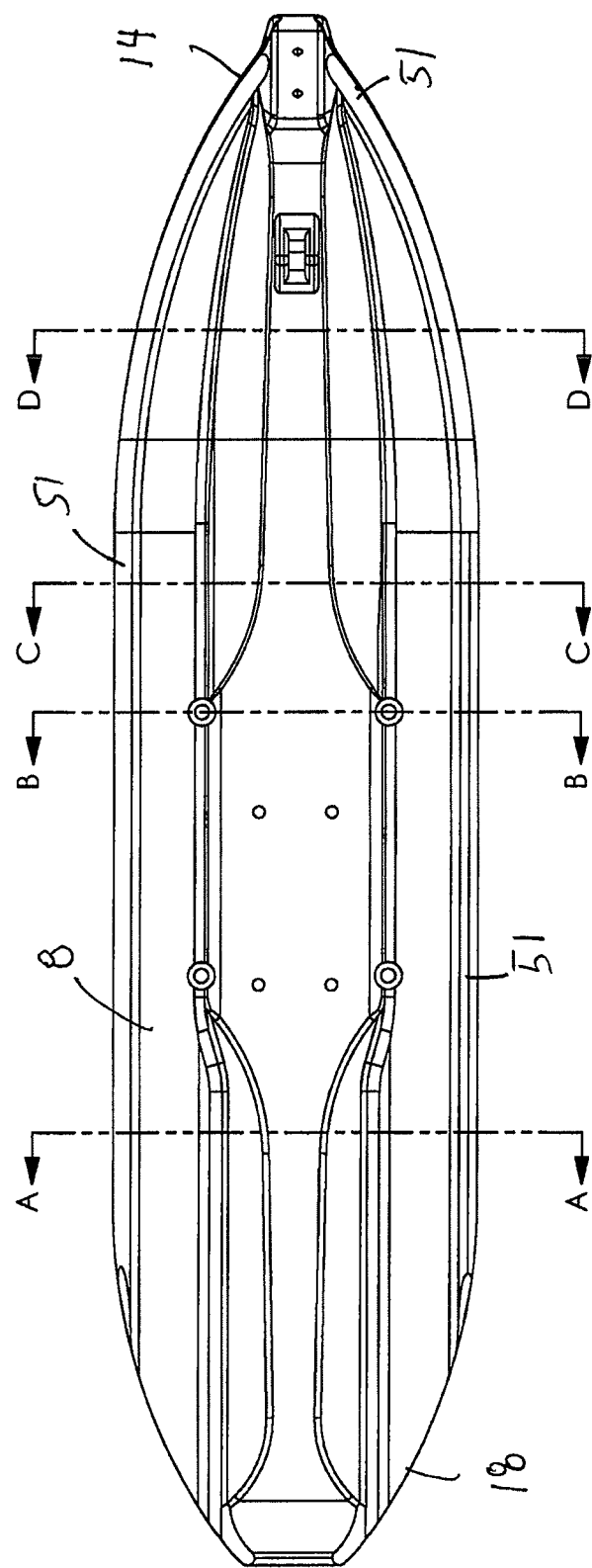
FIG. 12 is a top plan view of the SKI of FIG. 1.

FIGS. 1 through 18 show aspects of snow machine ski 10 in accordance with the present invention. As illustrated in FIG. 1, snow machine ski 10 has a body 12 functionally divided into an upturned tip 14, a tail 18, and an intervening base portion 16. Body 12 of snow machine ski 10 extends in a longitudinal direction 15a from tip 14 through tail 18 and has a width extending in a lateral direction 15b between a first edge 17 and a second edge 19. Body 12 also has a depth in a vertical direction 15c. Ski 10 in FIG. 1 further includes a pair of longitudinally extending wing sections, or "wings" 8. In the illustrated embodiment, ski 10 is generally symmetric about longitudinal plane. For example, keels 20 are equidistant from a centerline of channel 24. In alternative embodiments, keels 20 may be located at different distances relative to edges 17, 19. A gliding surface 28 is generally defined as the ski surface in contact with snow during machine operation, e.g., portions of tip 14, tail 18, base portion 16, wings 18 and keels 20. The relatively thick base portion 16 provides stiffness to the ski that aids in maintaining flotation and steering ability, while the comparatively thinner tip 14 and tail 18 impart flexibility to ski 10. Flexibility allows tip 14 to bend, aiding the ski to "climb" out of and remain on the surface of deep snow. The flexibility of tip 14 and tail 18 also affords a shock absorption capability to ski 10.

In the illustrated embodiments, wings 8 are substantially thinner than other portions of the body 12. As illustrated, wings 8 are integrated into a single piece molded part. In other embodiments of the invention, wings 8 may be separable parts capable of being removed or replaced after wear or damage. Wings 8 are shown with an upwardly extending, generally planar underside which provides for better ski floatation in deep powder as compared to a ski without wings 8. In other embodiments of ski 10, wings 8 extend generally horizontally (no upward extension). Wings 8 extend along ski 10 substantially from tip 14 to tail 18. As shown, for example at FIG. 11, wings 8 include a pair of parallel edges 27 having lengths, L1, L2, substantially equal to the lengths of the keels 20, L2. The keels 20 are substantially parallel to the pair of parallel edges 27 across generally the entire length of ski 10.

Wings 8 of snow machine ski 10 are preferably homogeneously molded from a material with a relatively low coefficient of friction on snow and ice. A material with a low modulus of elasticity relative to that of metal is also desired. In one embodiment the material is a polymer or plastic. In one preferred embodiment, body 12 is compression molded from a durable thermoplastic material such as TIVAR-brand UHMW. Forming snow machine ski 10 from plastic also reduces the weight and increases the flexibility of the snow machine ski 10.

Wings 8 may preferably be between 1.0 to 6 inches in width (as measured from an edge of keel 20 to ski edge 50). In preferred embodiments of the invention, wings 8 have a width which is approximately 50% of the width of channel 24. In one ski embodiment wings 8 are approximately 3 inches in width. Embodiments of ski 10 of the present invention are preferably between 8 to 14 inches in width (measured through the portion of ski 10 containing the parallel edges 27), and more particularly between approximately 10-12 inches in width. In a preferred embodiment, ski 8 has a width of approximately 10 inches. As used herein, the length of the ski 10 and the length of the wings 8 are measured in the longitudinal direction of the ski. The width of the ski 10 and width of the wings 8 are measured in a transverse direction.

Wing 8 thickness may range from about 0.05 inch to about 0.75 inch. Wing 8 thickness may vary as a function of lateral position from keel 20. As shown in FIGS. 13-16, local wing 8 thickness decreases with an increase in the distance to keel 20, thereby defining a generally tapering form across laterally extending portions of wing 8. In one embodiment of ski 10, a portion of wing 8 has a thickness of approximately ⅛th inch. In a preferred embodiment, wings 8 are substantially thinner than other portions of ski 10 and, as a result, are generally more flexible than other portions of ski 8. During cornering of the snow machine, wings 8 may deflect to provide keels 20 with enhanced access to snow.

In the illustrated embodiment, wings 8 are provided with longitudinal ribs 51. In one embodiment, rib 51 approximates a 0.5 in. solid rod extending along an outer edge of wing 8. In other embodiments, rib 51 can be defined with non-circular cross sections, for example, rectangular or oval shapes. Rib 51, in the illustrated embodiment, is positioned away from the underside of wing 8 surface. In other words, portions of rib 51 would not typically engage snow during straight travel use. In cornering conditions, portions of rib 51 engage snow and tend to prevent the wing 8 edge from burying itself in the snow surface. A portion 52 of rib 51 may be generally vertical and function to provide additional resistance to side slippage in a turn and provide additional structural rigidity to wing 8. In order to improve ski 10 handling characteristics, at least a portion of rib 51 is substantially thicker than portions of wing 8. Wings 8 extend substantially an entire length of said ski from a front tip to a rear edge, and with said pair of wings further defined by a pair of generally parallel edges extending generally parallel to said pair of keels.

A top surface 26 of snow machine ski 10 has provided thereon a means for connecting to the steering mechanism of a snow machine. In the depicted embodiment, a mounting bracket 30 is provided for connecting to a steering spindle of a snowmobile. A loop 32 may be provided to act as a bumper for protecting the front of the ski from impacts, while also providing a gripping handle for the operator. Loop 32 is preferably dynamically mounted at one or both ends, providing flexibility and shock absorption to tip 14.

In the depicted embodiment, loop 32 is fixedly attached to tip 14 of ski 10 with bolts 13. Loop 32 bends up and back, transitioning through a first apertured sliding brace 36, and through a second apertured sliding brace 34. A free end of loop 32 (not shown) is movable in a longitudinal direction with respect to braces 34, 36, allowing it to flex within braces 34, 36. This arrangement allows the tip 14 to flex backwards and absorb shock normally transmitted through conventional snow machine skis.

A concavity 25 is shown formed in the gliding surface of ski 10 beginning at tip 14. In depicted embodiments, two elongated keels 20 protrude downward from edges 17, 19 of base portion 16. While keels 20 may extend over the length of body 12, each of the keels 20 preferably extends longitudinally along the bottom of the base portion 16, and is not present on tip 14 or tail 18.

Figure 13:
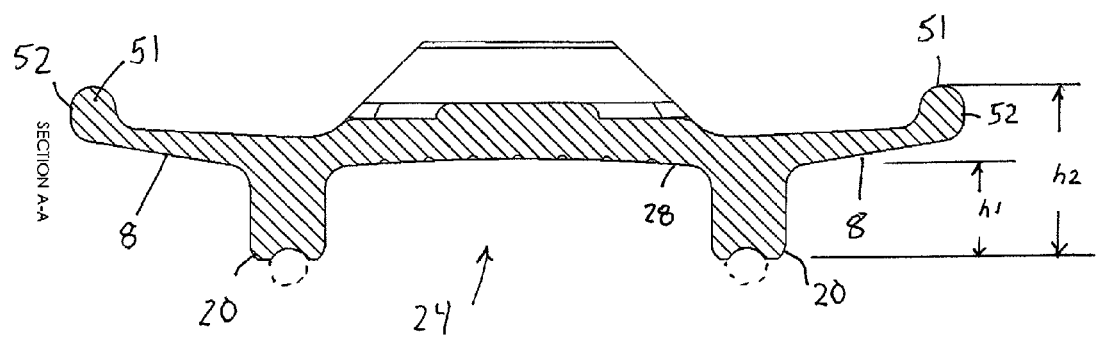
FIG. 13 is a cross-sectional detail of the ski of FIG. 12 taken around line A-A of FIG. 12.
Figure 14:
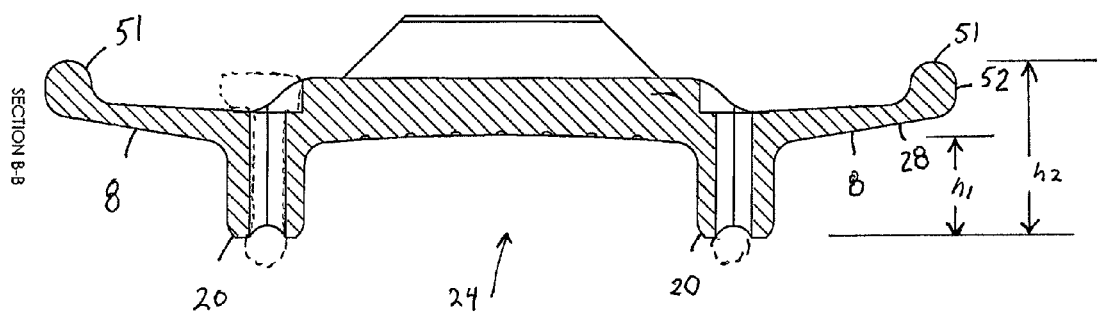
FIG. 14 is a cross-sectional detail of the ski of FIG. 12 taken around line B-B of FIG. 12.
Figure 15:
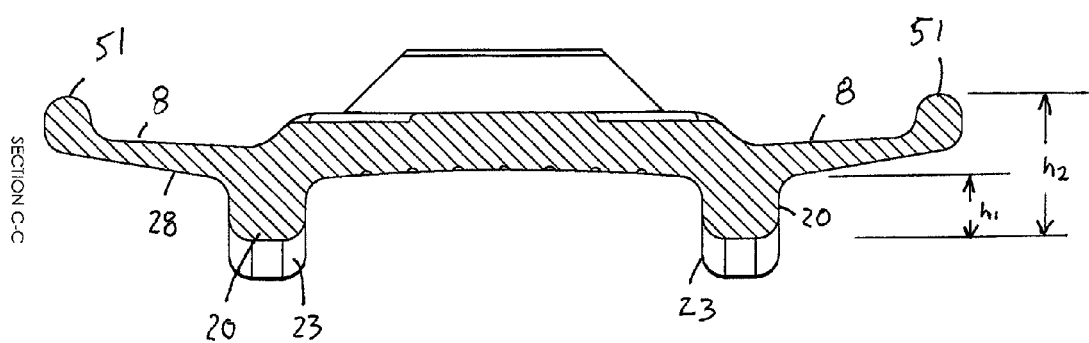
FIG. 15 is a cross-sectional detail of the ski of FIG. 12 taken around line C-C of FIG. 12.
Figure 16:
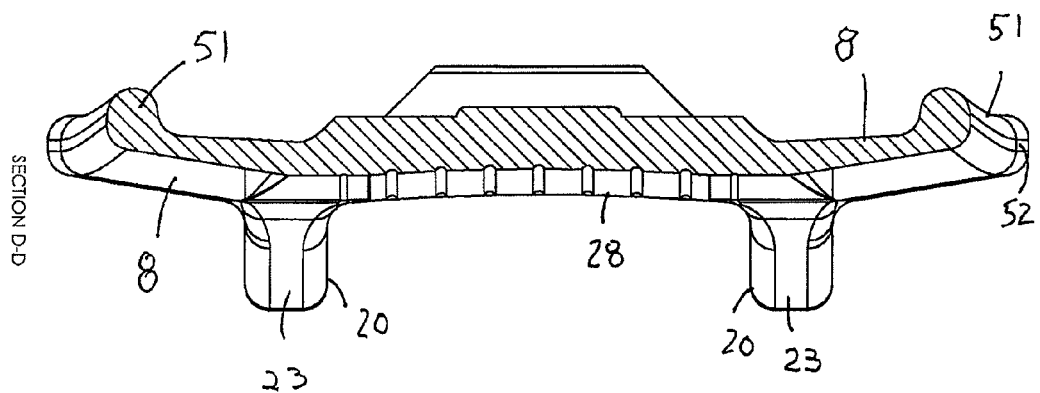
FIG. 16 is a cross-sectional detail of the ski of FIG. 12 taken around line D-D of FIG. 12.
Figure 17:
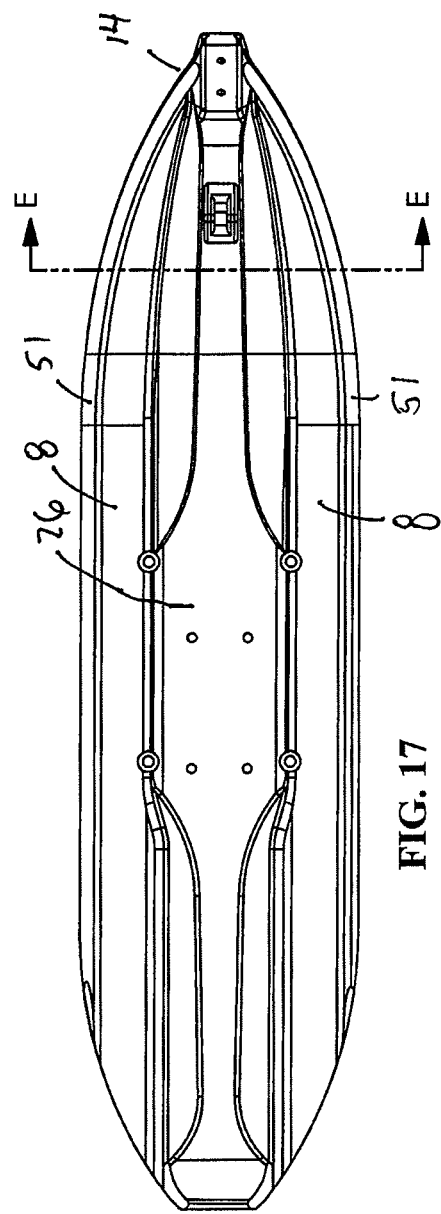
FIG. 17 is a top plan view of the SKI of FIG. 1.
Figure 18:
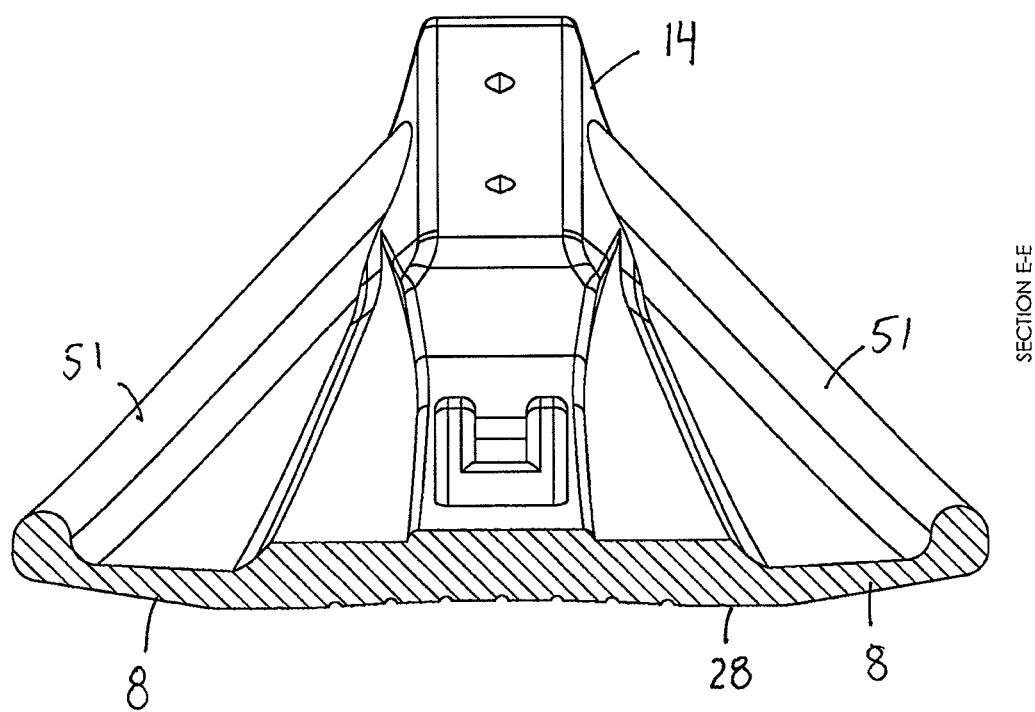
FIG. 18 is a cross-sectional detail of the ski of FIG. 17 taken around line E-E of FIG. 17.

The keels 20 are shown in cross-sectional views in FIGS. 13-15. The gliding surface 28 could be otherwise configured, but is preferably contoured in some manner. Each keel has a height, h1, as shown in FIGS. 13-15. The overall height, h2, of the ski 10 is also shown. The ski 10 is relatively compact in cross-section and the ski height, h2, is less than twice the keel height, h1. In the illustrated embodiment, the keel height, h1, is approximately 60% of the overall ski height, h2. This relationship between keel height and overall ski height exists throughout the keel length of the ski as shown in FIGS. 13-15 to provide a compact ski 10 with improve performance characteristics.

Shown connected to bottom 43 of each of keel 20 is elongated metal wear bar 22. Wear bars 43 are designed to make primary contact with harder surfaces, such as roadways and packed or icy snow, to prevent wear. Wear bars 43 are also designed to focus the weight of the snow machine on a smaller surface area, acting as runners and guides for improved steering control.

Channel 24 is shown defined by portions of the gliding surface, e.g., concavity 25 and inner walls of keels 20. Channel 24 extends in the longitudinal direction 15a along the gliding surface 28 of ski 10, toward tail 18, where ski 10 is depicted as being substantially flat. Consequently, channel 24 is shallow at the tip 14, and increases in depth 13a as it transitions to base portion 16. In the illustrated embodiment, channel 24 maintains a substantially consistent depth and thickness across a portion of base 16. The keels are preferably about one inch in depth and of a thickness of approximately one half inch In the depicted embodiment the forward tip of each of the keels 20 wedges outward laterally, narrowing in a lateral direction 15b, as keel 20 progresses longitudinally from a forward apex 21 rearward. Keels 20 may each also wedge inward at the rear toward a rear apex 23.

The wedging action of keels 20, together with concavity 25 helps to gather and funnel snow into the front of channel 24, providing lift to the snow machine during operation. The wedging at the rear of keels 20 allows the snow to freely exit from the rear of the channel 24.

In the depicted embodiment, keels 20 are shown wedging downwards from the forward apex 21 rearward. Keels 20 wedge upward again as the keels progress toward rear apex 23. This vertical wedging helps to provide less friction, allow the ski 10 to overcome obstacles, and further increasing flotation of the ski 10.

When ski 10 is moving relative to the snow, a high volume of snow is funneled under ski 10 by concavity 25 and/or keel wedges and captured within channel 24 or engaged by wings 8 to provide additional lift. Snow flowing into channel 24 also provides lift to tip 14, providing additional flotation to the ski 10. Thus, ski 10 provides a resistance to snow in the vertical direction 15c, while providing a minimum of resistance to the flow of snow in the longitudinal direction 15a. The upturned tip 14 of ski 10 provides a transitional contact surface to snow when the ski is sunken within the snow to provide a maximum resistance, causing the ski to climb up out of the snow, and also directing the flow of snow through channel 24.

In order to provide a high surface area for higher vertical resistance and increased planing, snow machine ski 10 may be wider than conventional skis. In a preferred embodiment, body 12 is about 10 inches in width. The top surface 26 of the snow machine ski 10 may be flat, which keeps ski 10 light and renders relatively thin tip 14 and tail 18 more flexible. In other embodiments, top surface 26 may be ribbed or otherwise configured to reduce weight. The base portion 16 preferably does not substantially flex, and is relatively deep to provide strength and reinforcement. The keels 20 also lend structural rigidity to base portion 16. In order to further keep weight to a minimum, while imparting strength, body 12 is shown being of a substantially constant width between keels 20.

To accommodate these considerations while sacrificing only a minimal increase in resistance to the flow of snow, the top of channel 24, as depicted in FIGS. 13-15, may be substantially flat across the center 38 and radiused at corners 40. Thus, the channel 24 may approximate the shape of a half cylinder, for instance, further increasing hydraulic diameter and decreasing resistance to the longitudinal passage of snow past the snow machine ski 10.

To overcome some of the problems of pushing and darting, a series of longitudinal grooves 44 are formed in the gliding surface. Grooves 44 increase the lateral surface area for gripping the snow when snow machine ski 10 is turned relative to the facing of the snow machine. Nevertheless, the unobtrusive narrow width and shallow nature of the grooves 44 allow the gliding surface to be relatively smooth, allowing for low longitudinal friction.

A series of lands 46 are formed between grooves 44. The lands 46 are preferably much wider than grooves 44, forming the majority of the gliding surface. It is preferred that the lands 44 provide a flat contact surface at the tip thereof In this manner, the gliding surface has a continuous contour, broken only by grooves 44.

The grooved/ribbed gliding surface of ski 10 also increases the shear force available to hold the snow machine ski 10 in the desired lateral position. Moreover, keels 20 tend to capture and pack into the grooves the snow in turns using the skis 10 momentum. Of course, it will be apparent to one skilled in the art that grooves 44 may be configured in other, selected dimensions, cross-sectional shapes, and configurations to balance competing consideration discussed herein. For instance, deepening grooves 44 tends to increase the responsiveness of snow machine skis 10 to a change in course, as does increasing the width and number of the grooves 44 and steepening the sides of grooves 44. Nevertheless, increasing the responsiveness of snow machine skis 10 in this manner can be dangerous to an inexperienced operator or one who is not informed of the increased handling capability of ski 10.

In operation of the snow machine, especially at high speeds in deep powder snow, the skis may function effectively upon principles of fluid dynamics, providing floatation (e.g., by tips 14, channels 24, and wings 8) and ruddering (e.g., by keels 20) in deep or loose snow. Skis 10 may also effectively function upon principles of mechanical dynamics and solid mechanics of snow when snow machine skis 10 are turned, slowed, etc., in wet or packed conditions, thus trapping and packing the snow within channel 24 while allowing wings 8 to easily deflect upwardly and providing addition operative access to keels 20, and causing the snow machine to turn sharply, responsive to a direction set by the operator.

The embodiment of ski 10 having wings 8 and ruddering keels 20, in accord with the present invention, can be used with snow machine skis other than those described in detail herein. Ski 10 of the present invention can also be used on all types of powered snow machines, including dual tracked "snow cat" snow machines and singe ski powered snow machines. As discussed, ski 10 provides snow machines so equipped with better tracking, control, and flotation over a broader range of speeds, snow conditions, and operating conditions over prior art snow machine skis. Furthermore, due to the reduction in pushing and darting, the snow machine ski of the present invention also provides a better ability to traverse hills, allowing an operator to maneuver effectively on hills in any direction without being limited to going only straight up and straight down. This better control, tracking, "side hilling" and flotation allows access to locations that were previously inaccessible to vehicles in winter.

Figure 19:
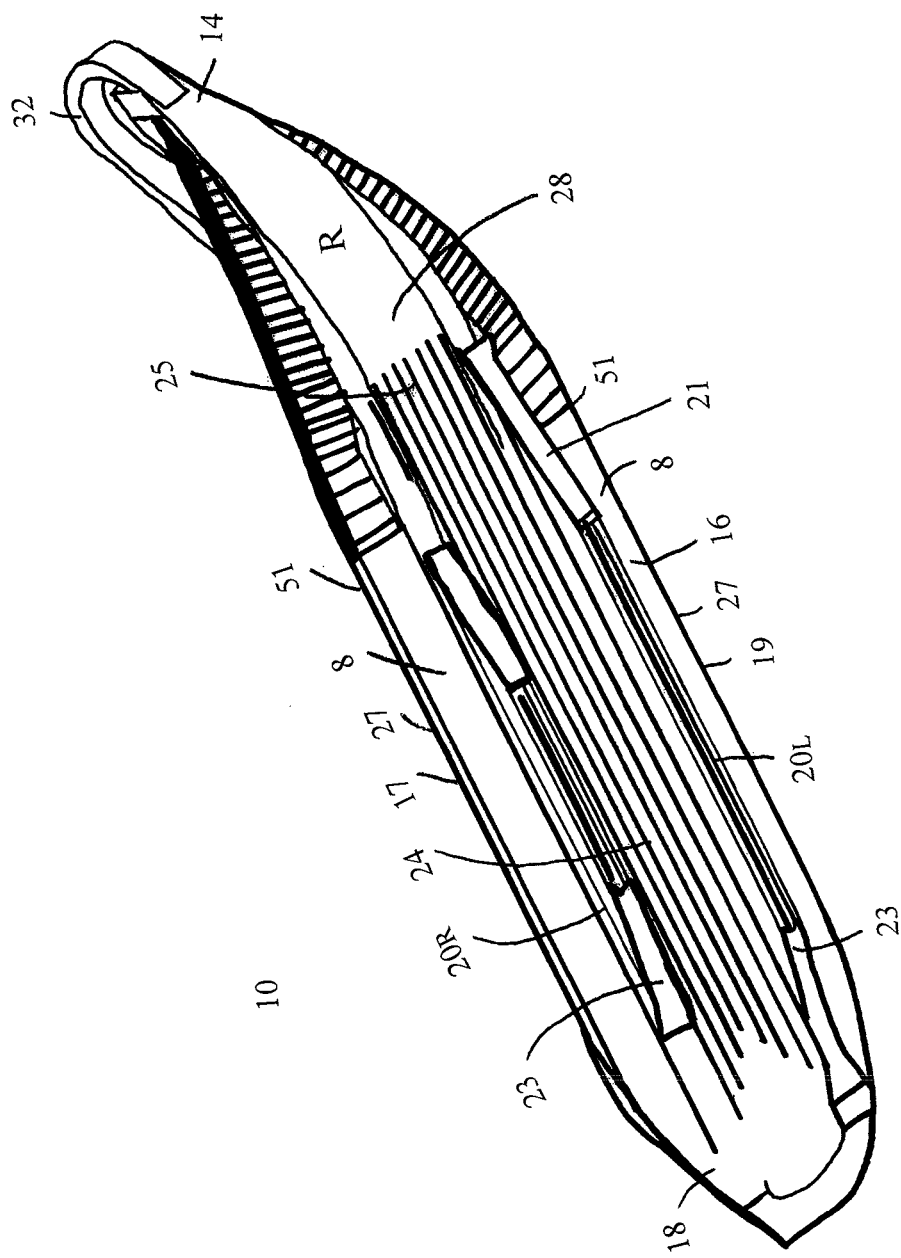
FIGS. 19-22 illustrate a second embodiment of a snowmobile ski.
Figure 20:
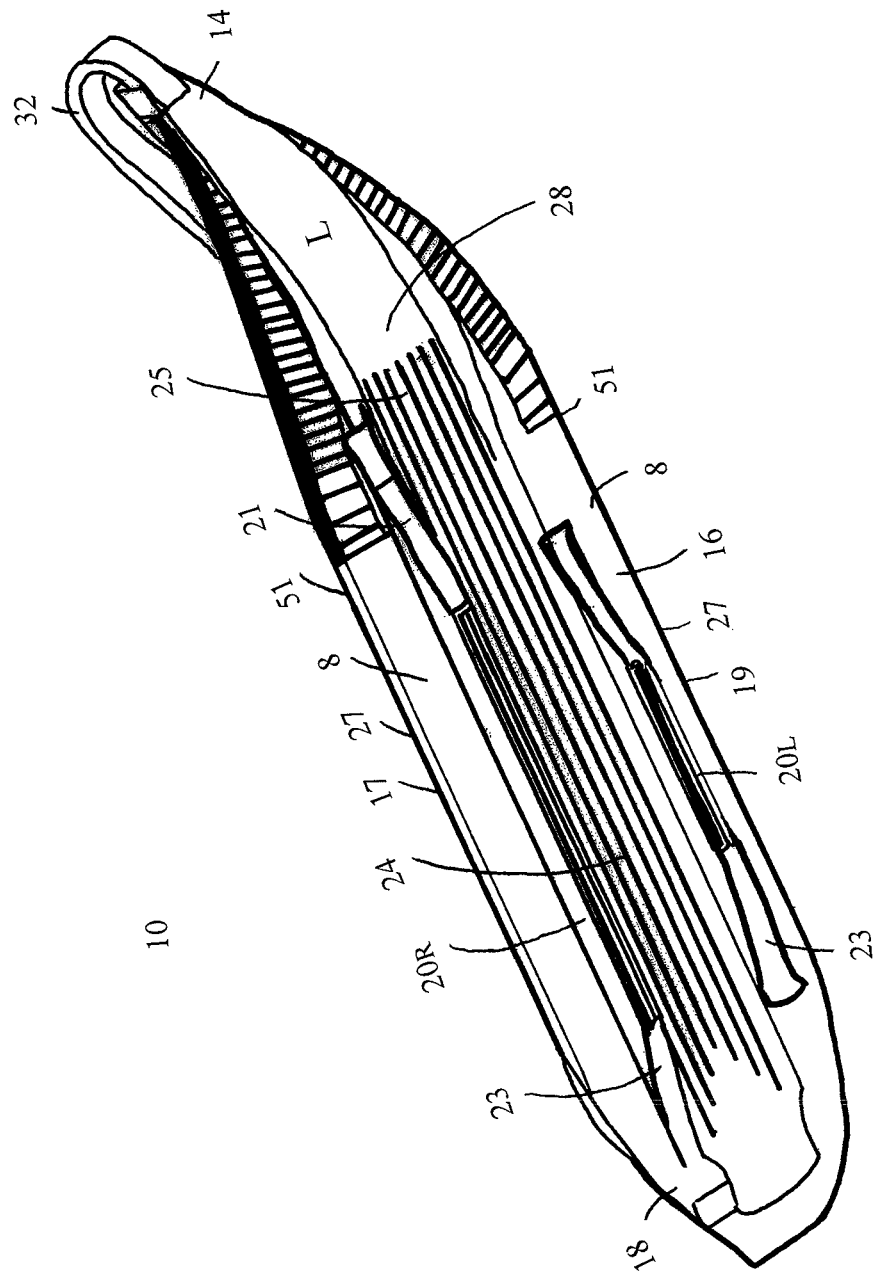

FIGS. 19-22 illustrate another embodiment of the invention wherein the keels 20 have substantially different lengths. The asymmetric keels 20 of this ski embodiment yield improvements in snowmobile handling across a variety of terrain. FIG. 19 depicts a ski 100 for use on a right hand side of the snowmobile (from a seated operator's perspective). The shorter keel 20R is positioned at an outer edge of the snowmobile with the longer keel 20L being positioned closer to a longitudinal centerline of the snowmobile. FIG. 20 depicts a ski 10 for use on the left hand side of the snowmobile and is generally a mirror image of the ski 10 of FIG. 19. The shorter keel 20L on the left handed ski 10 of FIG. 20 is positioned toward an outer edge (left) of the snowmobile. Thus a snowmobile utilizing the pair of skis 100 of FIGS. 19 and 20 would have the pair of longer keels 20 being positioned toward the snowmobile's centerline and the pair of shorter keels 20 being positioned at the outer edges of the snowmobile. The positioning of the shorter keels 20 toward the outer edges of the snowmobile is counterintuitive. At least one reference teaches a longer keel being positioned toward the outer edge of the snowmobile with the short keel being positioned toward a machine centerline.

Figure 21:
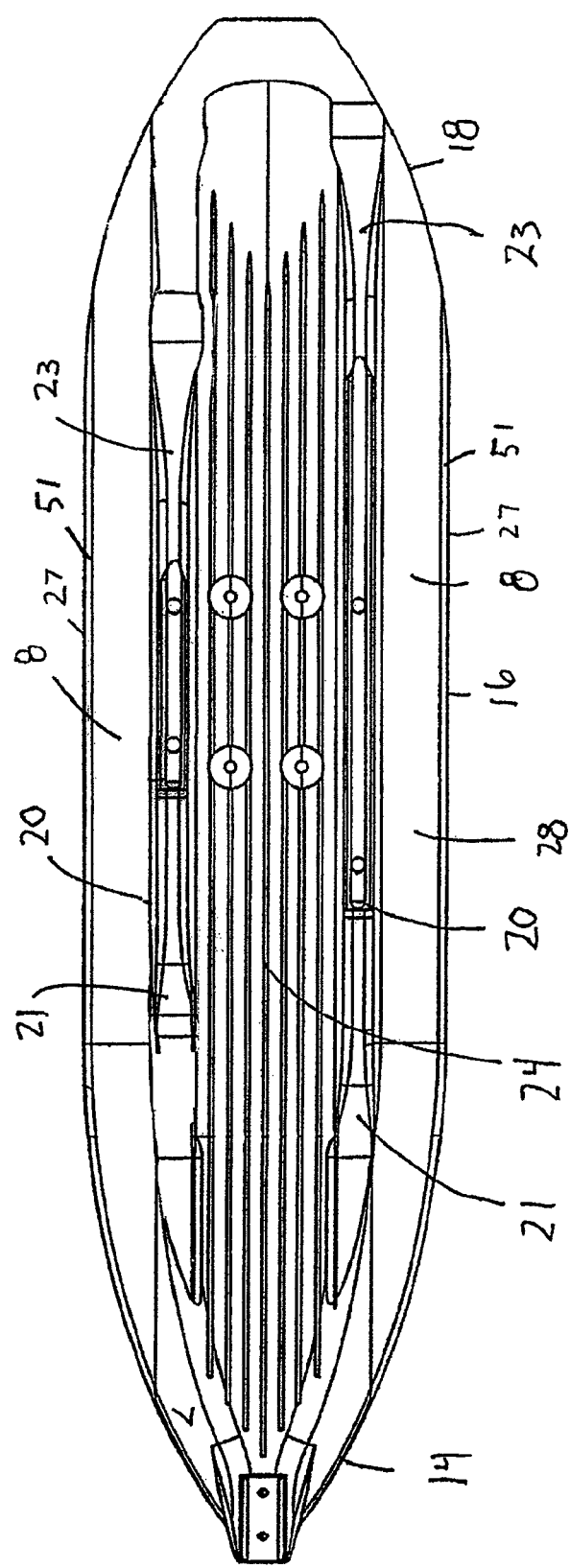
Figure 22:
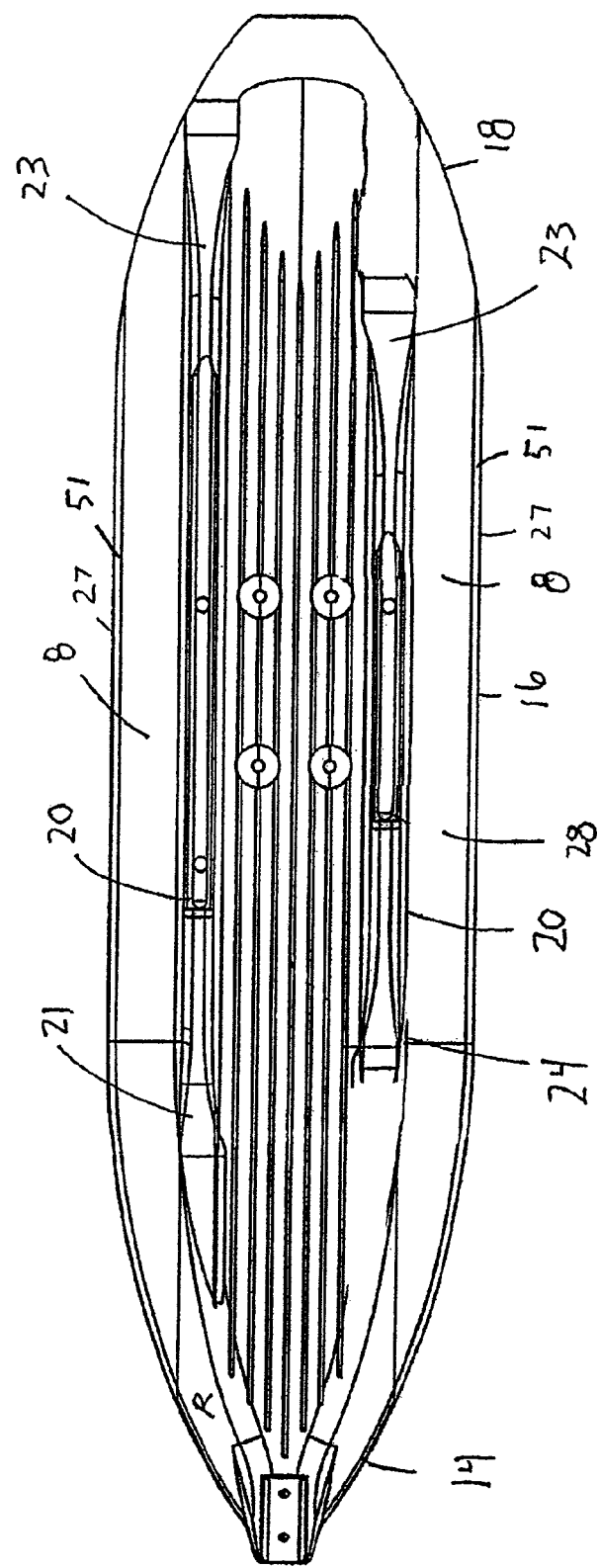

FIGS. 21 and 22 depict plan views of a pair of asymmetric skis 102 suitable for use on a snowmobile. The length of a wear bar of the shorter keel 20 is approximately 50% of the wear bar length of the longer keel 20. Each of the keels 20 is centered along the mounting plate apertures. FIG. 21 depicts a left-handed ski, while FIG. 22 depicts a right-handed ski (from the perspective of a seated operator). The cross-sectional characteristics of the skis of FIGS. 19-22 are similar to the cross-sections of FIGS. 13-15, i.e., the overall ski height, h2, is less than twice the keel height, h1 through the keel section of the ski 102. Improved snowmobile handing characteristics are provided with the pair of relatively compact skis 102 with asymmetric keels 20.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A snow ski comprising:
   a base having a top adapted to be connected to a snow machine and a gliding surface disposed at the bottom thereof for traveling over snow, the gliding surface extending in a longitudinal direction positionable to correspond to a desired direction of travel;
   a pair of keels integral to and extending downwardly from the base, said keels and a portion of said base therebetween defining a snow channel, with one of the pair of keels being shorter than the other one of the pair of keels, with said shorter one of the pair of keels being outboard from said other one of the pair of keels; a pair of wear bars extending along the bottom of the pair of keels, with an outboard wear bar being shorter than an inboard wear bar; and
   a pair of wings, one extending laterally from one of said pair of keels, and the other extending laterally from the other of said pair of keels, with a thickness of said pair of wings being smaller than a thickness of the ski within the snow channel, and a pair of ribs defined at outermost edges of said wings, said ribs being substantially thicker than other portions of said pair of wings.

2. The ski of claim 1 wherein the pair of wings are upwardly tilted away from the pair of keels.

3. The ski of claim 2 wherein the pair of wings have tapering cross sections, with end portions of the pair of wings being thinner than other portions of the pair of wings.

4. The ski of claim 1 wherein each of said pair of ribs approximate a rod of material having a diameter of approximately 0.5 inch.

5. The ski of claim 1 wherein said pair of ribs extend from a front portion of the ski substantially the entire length of the ski.

6. The ski of claim 1 wherein a bottom surface of the pair of wings is generally planar and the pair of ribs extend in an upward direction away from the lowermost edge of the pair of keels.

7. The ski of claim 1 wherein each of said pair of keels includes a portion extending forward of a mounting bracket and another portion extending rearward of the mounting bracket.

8. The ski of claim 7 wherein a first one of the pair of wear bars is approximately twice a length of a second one of the pair of wear bars.

9. A snow ski comprising:
   a base having a top adapted to be connected to a snow machine and a gliding surface disposed at the bottom thereof for traveling over snow, the gliding surface extending in a longitudinal direction positionable to correspond to a desired direction of travel;
   a pair of keels extending downwardly from the base, with one of the pair of keels being shorter than the other one of the pair of keels, with said shorter one of the pair of keels being outboard from said other one of the pair of keels said pair of keels defining portions of a snow channel, with a concave portion of the base directing snow into the snow channel;
   a pair of wings extending throughout a length of said ski, with one of the pair of wings extending laterally from one of said pair of keels, and the other extending laterally from the other of said pair of keels, and
   a pair of ribs defined at outermost edges of said ski and extending along the pair of wings upwardly away from the pair of keels, said ribs having a thickness which is greater than a thickness of the pair of wings.

10. The ski of claim 9 wherein the pair of wings have a thickness which is substantially smaller than a thickness of the ski between the pair of keels.

11. The ski of claim 9 wherein the first wear bar is approximately twice a length of the second wear bar.

12. A snow ski comprising:
    a gliding surface disposed at a ski bottom and extending in a longitudinal direction positionable to correspond to a desired direction of travel and extending in a lateral direction;
    a pair of downwardly extending keels, said pair of keels and said gliding surface defining portions of a snow channel, with a portion of the ski directing snow into the snow channel;
    a pair of wear bars attached to bottom portions of the pair of keels; and
    a pair of wings extending alongside the pair of keels, said wings being thinner than a portion of the ski between the pair of keels, and wherein each of said pair of wings extends along a length of said ski from a front tip to a tail, and with said pair of wings further defined by a pair of ribs extending along the pair of wings at outermost edges of said ski wherein an outboard one of the pair of keels and one of the pair of wear bars are shorter than the other one of the pair of keels and other one of the pair of wear bars.

13. The ski of claim 12 wherein the pair of ribs extend upwardly away from the pair of keels, with each of said pair of ribs having a thickness which is greater than a thickness of the pair of wings.

14. The ski of claim 13 wherein the ribs have a generally circular cross section.

15. The ski of claim 12 wherein the pair of keels are positioned directly underneath a mounting bracket affixed to the top of the ski, and each of the pair of keels is centered relative to the mounting bracket.

16. The ski of claim 12 wherein a width of one of the pair of wings is approximately 50% of a width of the ski between the pair of keels, as measured in the lateral direction.

17. A pair of snow skis comprising:
a first ski comprising:
- a gliding surface disposed at a ski bottom and extending in a longitudinal direction positionable to correspond to a desired direction of travel and extending in a lateral direction;
- a pair of downwardly extending keels, said pair of keels and said gliding surface defining portions of a snow channel, with a portion of the ski directing snow into the snow channel; and
- a pair of wings extending alongside the pair of keels, said wings being thinner than a portion of the ski between the pair of keels, and wherein each of said pair of wings extends along a length of said ski from a front tip to a tail, and with said pair of wings further defined by a pair of ribs extending along the pair of wings at outermost edges of said ski with said pair of ribs, and wherein one of the pair of keels is substantially shorter than the other, with the shorter of the pair of keels being disposed at an outer edge of a snowmobile and the longer of the pair of keels being disposed toward a longitudinal centerline of the snowmobile; and
- a second ski being a mirror image of the first ski to define a pair of skis for a snowmobile, with the pair of shorter keels being positioned toward outer edges of the snowmobile and the pair of longer keels being positioned toward the longitudinal centerline of the snowmobile.

18. The ski of claim 17 wherein a first wear bar positioned in the longer keel is approximately twice a length of a second wear bar positioned in the shorter keel.

19. The ski of claim 17 wherein the pair of keels are positioned directly underneath a mounting bracket affixed to a top of the snow ski.

* * * * *

UNITED STATES PATENT AND TRADEMARK OFFICE
CERTIFICATE OF CORRECTION

PATENT NO. : 8,641,055 B2  
APPLICATION NO. : 13/412526  
DATED : February 4, 2014  
INVENTOR(S) : Simmons et al.

Page 1 of 1

It is certified that error appears in the above-identified patent and that said Letters Patent is hereby corrected as shown below:

In the Claims

Column 8, Claim 12, line 48, delete "from a front tip to a tail,".

Column 9, Claim 17, line 14, delete "from a front".

Column 9, Claim 17, line 15, delete "tip to a tail".

Column 9, Claim 17, line 18, delete "substantially".

Signed and Sealed this
Sixteenth Day of September, 2014

Michelle K. Lee
*Deputy Director of the United States Patent and Trademark Office*